(12) United States Patent
Pietrasz et al.

(10) Patent No.: US 9,178,220 B2
(45) Date of Patent: Nov. 3, 2015

(54) CATALYST ASSEMBLY INCLUDING AN INTERMETALLIC COMPOUND OF IRIDIUM AND TUNGSTEN

(71) Applicant: Ford Global Technologies, LLC, Dearborn, MI (US)

(72) Inventors: Patrick Pietrasz, Southgate, MI (US); Jun Yang, Bloomfield Hills, MI (US); Mark S. Sulek, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 312 days.

(21) Appl. No.: 13/756,621

(22) Filed: Feb. 1, 2013

(65) Prior Publication Data

US 2014/0220475 A1    Aug. 7, 2014

(51) Int. Cl.
| | |
|---|---|
| H01M 4/66 | (2006.01) |
| H01M 4/92 | (2006.01) |
| H01M 8/02 | (2006.01) |
| B01J 23/42 | (2006.01) |
| B01J 37/34 | (2006.01) |
| H01M 4/90 | (2006.01) |
| B01J 23/652 | (2006.01) |
| H01M 4/86 | (2006.01) |

(52) U.S. Cl.
CPC .......... *H01M 4/9058* (2013.01); *B01J 23/6527* (2013.01); *H01M 4/8621* (2013.01); *H01M 4/9075* (2013.01); *Y02E 60/50* (2013.01)

(58) Field of Classification Search
CPC ............ H01M 4/9058; H01M 4/8621; H01M 4/9075; B01J 23/6527
USPC ............... 429/487, 519, 520, 522; 502/5, 313
See application file for complete search history.

(56) References Cited

U.S. PATENT DOCUMENTS

| | | | |
|---|---|---|---|
| 4,871,626 A * | 10/1989 | Williams | ........................ 429/11 |
| 6,833,212 B2 | 12/2004 | Jeon et al. | |

(Continued)

FOREIGN PATENT DOCUMENTS

WO    2004109829 A1    12/2004

OTHER PUBLICATIONS

Litster, S., et al., PEM Fuel Cell Electrodes, Journal of Power Sources, vol. 130, 2004, pp. 61-76.

(Continued)

*Primary Examiner* — Sean P Cullen
(74) *Attorney, Agent, or Firm* — Damian Porcari; Brooks Kushman P.C.

(57) ABSTRACT

A catalyst assembly having a substrate including an intermetallic compound of W and Ir. The weight ratio of W to Ir is in a range between a first ratio and a second ratio. A catalyst includes at least one noble metal is supported on and contacts the substrate. The first ratio may be in the range of 48:52 and the second ratio may be in the range of 51:49.

18 Claims, 9 Drawing Sheets

(56) References Cited

U.S. PATENT DOCUMENTS

| | | | |
|---|---|---|---|
| 2007/0264560 A1* | 11/2007 | Alexandrovichserov et al. | 429/44 |
| 2008/0020261 A1 | 1/2008 | Hendricks et al. | |
| 2008/0166599 A1 | 7/2008 | Swathirajan et al. | |
| 2008/0318097 A1 | 12/2008 | Botte | |
| 2010/0086822 A1 | 4/2010 | Omersa | |
| 2010/0216632 A1 | 8/2010 | Adzic et al. | |
| 2010/0316930 A1 | 12/2010 | Shao et al. | |
| 2010/0316931 A1 | 12/2010 | Wieland | |
| 2011/0033784 A1 | 2/2011 | Ljungcrantz et al. | |
| 2011/0166012 A1* | 7/2011 | Yang et al. | 502/159 |
| 2011/0229795 A1 | 9/2011 | Niu et al. | |
| 2012/0202683 A1* | 8/2012 | Shirvanian | 502/339 |

OTHER PUBLICATIONS

Wroblowa, Halina S., et al., Electroreduction of Oxygen a New Mechanistic Criterion, J. Electroanal Chem., vol. 69, 1976, pp. 195-201.

Othman, Rapidah, et al., Non-Precious Metal Catalysts for the PEM Fuel Cell Cathode, Int'l. Journal of Hydrogen Energy, vol. 37, Issue 1, Jan. 2012, pp. 357-372.

Wang, Xiao-Dong, et al., Parameter Sensitivity Examination for a Complete Three-Dimensional, Two-Phase, Non-Isothermal Model of Polymer Electrolyte Membrane Fuel Cell, International Journal of Hydrogen Energy, vol. 37, 2012, pp. 15766-15777.

* cited by examiner

CATALYST ASSEMBLY INCLUDING AN INTERMETALLIC COMPOUND OF IRIDIUM AND TUNGSTEN

TECHNICAL FIELD

The present invention relates to a catalyst assembly including an intermetallic compound of iridium and tungsten, and a method of making the same.

BACKGROUND

Fuel cells are used as an electrical power source in many applications. In particular, fuel cells are proposed for use in automobiles to replace internal combustion engines. A commonly used fuel cell design uses a proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the catalyst of the fuel supply electrode. Typically, each electrode has finely divided catalyst particles, supported on carbon particles, to promote oxidation of hydrogen at the anode and reduction of oxygen at the cathode. Protons flow from the anode through the ion conductive polymer membrane to the cathode where they combine with oxygen to form water which is discharged from the cell.

The MEA is sandwiched between a pair of porous gas diffusion layers ("GDL") which in turn are sandwiched between a pair of non-porous, electrically conductive elements or plates. The GDL may also be referred to as the base layer. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in a grouping of many cells into a stack. Higher power output may be achieved through using arrays of many individual fuel cell stacks or increasing the cell count in a single stack in order to provide high levels of electrical power.

Fuel cells have been pursued as a source of power for transportation because of their high energy efficiency and their zero greenhouse emissions to the environment. However, broad commercialization of the fuel cells has been met with many limitations, particularly in relation to the relatively high cost of the fuel cell catalyst. Some of catalyst metals as used in fuel cell applications include noble and transition metals, such as platinum, which are very expensive. An amount of about 0.3 to 4 milligrams per square centimeter precious metals such as platinum is often required for a conventional fuel cell catalyst. It has been estimated that the total cost of the precious metal catalysts is up to 75 percent (%) of the total cost of manufacturing a low-temperature fuel cell.

SUMMARY

In one or more embodiments, a catalyst assembly includes an intermetallic compound of W and Ir. The weight ratio of W to Ir is a range between a first ratio and a second ratio. The catalyst is supported on and contacts a substrate. The catalyst includes at least one noble metal. The specific activity of the combination of the substrate and catalyst is in the range of 2400 to 3600 $\mu A/cm^2$. An X-Ray Diffraction ("XRD") profile of the intermetallic compound of W and Ir includes one or more peaks not present in an XRD profile of atomic W or Ir, individually. The substrate may have a thickness of 10 to 50 nm. The substrate thickness to the catalyst thickness may be in the range of 2:1 to 10:1.

In one or more embodiments, a method of forming a catalyst assembly is described. The method includes depositing a substrate layer of Ir and W onto a base. The substrate layer of Ir and W forms an intermetallic compound of W and Ir on the base. The catalyst includes a noble metal. The catalyst is deposited and contacts the substrate layer.

DETAILED DESCRIPTION OF ONE OR MORE EMBODIMENTS

Figure 1A:
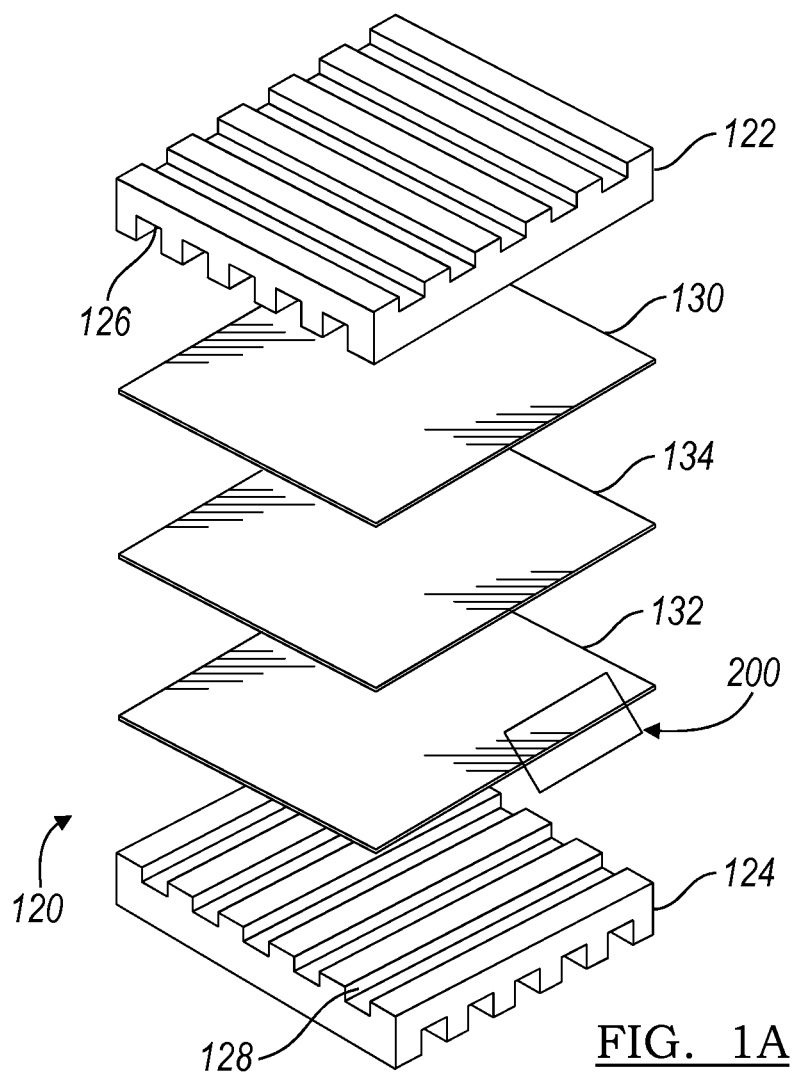
FIG. 1A schematically depicts an exemplary fuel cell.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in the description and in the claims are to be understood as modified by the word "about" in describing the broader scope of this invention. Also, unless expressly stated to the contrary, the description of a group or class of material as suitable or preferred for a given purpose in connection with the invention implies that mixtures of any two or more members of the group or class may be equally suitable or preferred.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Tungsten (W) has been indicated with certain beneficial properties in supporting fuel cell catalysts such as platinum catalyst. However, a problem with the use of tungsten is the likely formation of tungsten oxide ($WO_3$). The formation of insulating $WO_3$ in turn may induce the platinum catalyst to lose electro-catalytic activities.

In one or more embodiments, W may be mixed with iridium (Ir) in certain weight to form an intermetallic compound of W and Ir. As detailed herein, a catalyst supported on a substrate including or formed of the intermetallic compound of W and Ir can perform with a catalytic activity greater than the sum of the performances otherwise delivered by W or Ir alone.

This is surprising at least because Ir may not generally be a candidate of choice for enhancing the kinetic activity of a supported catalyst, at least because Ir may not readily adhere to its support, such as glassy carbon and may delaminate over time. When compounded with Ir added in certain weight ratio, W is believed to form an intermetallic compound with Ir and the resultant intermetallic compound of Ir and W can be used to support a catalyst for use in fuel cell operations.

Figure 7:
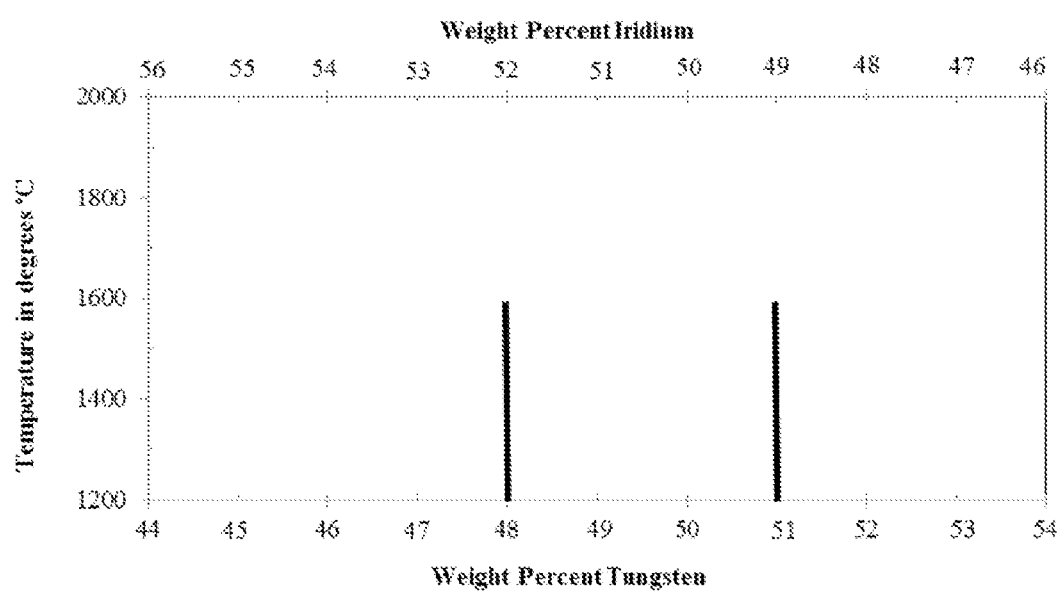
FIG. 7 shows a section of the binary phase diagram of W and Ir.

According to at least one aspect, as shown in FIG. 7, the weight percent of W is selected for desired non-corrosion characteristics and increased specific activity of the catalyst. In a homogenous matrix where the W and Ir are intermixed, an ordered atom configuration of W and Ir atoms occupy fixed locations in a crystal lattice to form an intermetallic compound. An intermetallic compound is a non-limiting example of a metallic alloy.

An alloy or a metallic alloy, as used in at least one embodiment and unless otherwise indicated, refers to a mixture of metals wherein at least one component metal presents a crystal structure that differs from respective original structure of the metal in its pure metal form.

In one or more refinement, an intermetallic compound is not a simple solid solution of the two elements, but rather a new compound or an alloy of W and Ir structurally different from W or Ir alone. The intermetallic compound may be distinguished from a solid solution by way of X-Ray Diffraction (XRD) analysis. An XRD analysis of the solid solution of Ir and W would reveal no new peaks additional to peaks particular to Ir and W individually, in any appreciable amount. In direct comparison, and when presented in an intermetallic compound configuration, peaks not otherwise present in Ir or W alone may appear in an XRD profile.

Diffraction occurs as waves interact with a regular structure whose repeat distance is about the same as the wavelength. X-rays have wavelengths on the order of a few angstroms, the same as typical interatomic distances in crystalline solids. That means X-rays can be diffracted from minerals which, by definition, are crystalline and have regularly repeating atomic structures. The angle of diffraction is the theta angle, which is measured in degrees. For practical reasons, a diffractometer measures an angle twice that of the theta angle, which is named "2Theta".

The XRD profile of a cubic crystal of W may be presented by the following characteristic peaks: a peak of 100% relative intensity positioned at 2Theta of 36 to 44, a peak of 12 to 20% relative intensity positioned at 2Theta of 54 to 62, a peak of 21 to 29% relative intensity positioned at 2Theta of 69 to 77, a peak of 5 to 13% relative intensity positioned at 2Theta of 83 to 91, a peak of 12% relative intensity positioned at 2Theta of 101, a peak of 1 to 9% relative intensity positioned at 2Theta of 111 to 119, a peak of 18 to 22% relative intensity positioned at 2Theta of 127 to 135. In certain instances, the XRD profile of a cubic crystal of W includes any one of, any two of, any three of, any four of, any five of, any six of, or all seven of these characteristic peaks.

The XRD profile of a cubic crystal of Ir may be presented by the following characteristic peaks: a peak of 100% relative intensity positioned at 2Theta of 36 to 44, a peak of 46 to 54% relative intensity positioned at 2Theta of 43 to 51, a peak of 36 to 44% relative intensity at 2Theta of 65 to 73, a peak of 42 to 50% relative intensity positioned at 2Theta of 79 to 87, a peak of 11 to 19% relative intensity positioned at 2Theta of 83 to 91, a peak of 6 to 14% relative intensity positioned at 2Theta of 103 to 110, a peak of 41 to 49% relative intensity positioned at 2Theta of 118 to 126, a peak of 41 to 49% relative intensity positioned at 2Theta of 123 to 131, and a peak of 46 to 54% relative intensity positioned at 2Theta of 155 to 163. In certain instances, the XRD profile of a cubic crystal of Ir includes any one of, any two of, any three of, any four of, any five of, any six of, any seven of, any eight of, or all nine of these characteristic peaks.

The XRD profile of a W/Ir intermetallic compound crystal may be presented by the following characteristic peaks: a peak of 100% relative intensity positioned at 2Theta of 39 to 47, a peak of 42 to 50% relative intensity positioned at 2Theta of 33 to 41, a peak of 31 to 39% relative intensity positioned at 2Theta of 23 to 31, a peak of 16 to 24% relative intensity positioned at 2Theta of 36 to 44.

The XRD profile of the W/Ir intermetallic compound may further be presented by one or more of the following peaks: a peak of 12 to 14% relative intensity positioned at 2Theta of 52 to 54, a peak of 9 to 12% relative intensity positioned at 2Theta of 55 to 57, a peak of 1 to 3% relative intensity positioned at 2Theta of 60 to 62, a peak of 9 to 11% relative intensity positioned at 2Theta of 65 to 67, a peak of 10 to 12% relative intensity positioned at 2Theta of 66 to 68, a peak of 4 to 6% relative intensity positioned at 2Theta of 68 to 70, a peak of 13 to 15% relative intensity positioned at 2Theta of 70 to 72, a peak of 1 to 3% relative intensity positioned at 2Theta of 74 to 76, a peak of 2 to 4% relative intensity positioned at 2Theta of 79 to 81, a peak of 1 to 3% relative intensity positioned at 2Theta of 81 to 83, a peak of 1 to 3% relative intensity positioned at 2Theta of 89 to 91, a peak of 2 to 4% relative intensity positioned at 2Theta of 93 to 95, a peak of 1 to 3% relative intensity positioned at 2Theta of 96 to 98, a peak of 3 to 5% relative intensity positioned at 2Theta of 101 to 103, a peak of 2 to 4% relative intensity positioned at 2Theta of 108 to 110, a peak of 1 to 3% relative intensity positioned at 2Theta of 119 to 121, a peak of 1 to 3% relative intensity positioned at 2Theta of 128 to 130, and a peak of 1 to 3% relative intensity positioned at 2Theta of 158 to 160.

For comparison amongst the XRD intensity profiles, the intensity ratio of the 100% relative intensity peak of the XRD of W crystal to the 100% relative intensity peak of the XRD of Ir crystal and to the 100% relative intensity peak of the XRD of W/Ir intermetallic compound crystal is 1:1:1.

In comparison to the XRD profile of W or Ir, the XRD profile of W/Ir intermetallic compound crystal may be unique in being presented with a peak positioned at 2Theta of 33 to 41 and/or a peak positioned at 2Theta of 23 to 31, as one or both of the two peaks are not of any measurable intensity in the XRD profiles of W and Ir, alone. In certain instances, the peak positioned at 2Theta of 33 to 41 may be presented with a relative intensity of 42 to 50%, and the peak positioned at 2Theta of 23 to 31 may be presented with a relative intensity of 31 to 39%.

In comparison to the XRD profile of W or Ir, the XRD profile of W/Ir intermetallic compound crystal may be unique in being presented with a peak of 16 to 24% relative intensity positioned at 2Theta of 36 to 44, while the corresponding peak for W or Ir alone is with a 100% relative intensity.

The intermetallic compound crystal of W/Ir may be formed by co-sputtering W and Ir in certain defined ratios. In at least one embodiment when presented with a W/Ir weight ratio of 2/3 to 3/2, W and Ir tend to form an intermetallic compound. In certain instances, the weight ratio of W/Ir may be 0.7 to 1.3, 0.8 to 1.2, 0.9 to 1.1, or 0.95 to 1.05. Without wanting to be limited to any particular theory, it is believed in the intermetallic configuration, Ir and W are so coordinated such that W atoms are relatively less susceptible to oxidation and hence relatively less formation of $WO_3$. With little or no formation of $WO_3$, which may otherwise react to hydrogen and get dissolved, the resulting catalyst supported thereupon is relatively more stable and hence more catalytically active.

In one embodiment, the co-sputtering of the W/Ir substrate layer is at a rate of 0.29 Angstroms/second. In another embodiment the sputtering of the catalyst layer is at a rate of 0.07 Angstroms/second. In one embodiment, the co-sputtering of the W/Ir substrate layer may be deposited at a rate of 0.01 to 5.0 Angstroms/second. In another embodiment, the sputtering of the catalyst layer may also be deposited at a rate of 0.01 to 5.0 Angstroms/second. This deposition rate range is generally accepted as being a slow rate of deposition, which is favorable for the formation of thin films.

The Ir/W weight ratios may be identified via the use of Inductively Coupled Plasma ("ICP"). An ICP is a type of plasma source in which the energy is supplied by electric currents from electromagnetic induction. When a time-varying electric current is passed through the coil, it creates a time-varying magnetic field around it, which in turn induces electric currents leading to the formation of a plasma. Argon is one example of a commonly-used rarefied gas.

The above-stated weight ratio of W to Ir is believed to form an intermetallic compound in which desirable non-corrosion characteristics of tungsten and hence increased specific activity of the catalyst can be expected. In the structure of the intermetallic compound of W and Ir, an ordered atom configuration of W and Ir atoms may be expected to occupy fixed locations in a crystal lattice.

As one non-limiting example, a homogenous cathode surface may be achieved having a 50-50 alloy. As another non-limiting example, Tungsten ranging from 48 to 51 weight percent consists of a single ordered matrix, crystal lattice.

According to at least one aspect, as shown in FIG. 7, the weight percent of W is selected for desired non-corrosion characteristics and increased specific activity of the catalyst. In a homogenous matrix where the W and Ir are intermixed, an ordered atom configuration of W and Ir atoms occupy fixed locations in a crystal lattice. As one non-limiting example, a homogenous cathode surface may be achieved having a 50-50 alloy. As another non-limiting example, the weight ratio of W to Ir may be in the range of 0.48:0.52 to 0.51:0.49 weight percent.

For purpose of illustration, an exemplary fuel cell 120 is schematically depicted in FIG. 1A. The fuel cell 120 includes a pair of bi-polar plates 122 and 124 having grooves 126 and 128 formed at a predetermined interval on both sides of each of the bi-polar plates 122 and 124. The fuel cell 120 also includes an ionic exchange membrane 134 disposed between the bi-polar plates 122 and 124, a first electrode such as an air electrode 132 disposed between the ionic exchange membrane 134 and the bi-polar plate 124, and a second electrode such as a fuel electrode 130 disposed between the ionic exchange membrane 134 and the bi-polar plate 122.

The bi-polar plates 122 and 124 are for electrically connecting the air electrode 132 and the fuel electrode 130, and preventing fuel and air (an oxidizer) from being mixed. The grooves 126 and 128 are used as fuel and air passages in the cells connected end to end.

In operation, air is brought into contact with the air electrode 132; while at the same time, hydrogen gas is brought into contact with the fuel electrode 130 as fuel, which results in separation of the hydrogen gas into hydrogen ions and electrons on the fuel electrode 130. These hydrogen ions are combined with water to move to the air electrode 132 side in the ionic exchange membrane 134, while the electrons move via on external circuit (not shown) to the air electrode 132 side. In the air electrode 132, oxygen, electrons, and hydrogen ions react to generate water.

When reactant gases are fed to respective electrodes 130, 132, triple phase interface involving a gaseous phase (reactant gas), a liquid phase (solid polyelectrolyte membrane), and a solid phase (catalyst supported on each electrode) is formed. The electrochemical reactions include the following: On the anode side $H_2 \rightarrow 2H^+ + 2e^-$. On the cathode side: $\frac{1}{2}O_2 + 2H^+ + 2e^- \rightarrow H_2O$. The hydrogen ($H^+$) ions formed on the anode side migrate to the cathode side through the solid polyelectrolyte membrane, while electrons migrate to the cathode side through an external load. On the other hand, on the cathode side, oxygen contained in the oxidizing agent gas reacts with the $H^+$ ions and electrons coming from the anode side to form water. Thus, the solid polyelectrolyte type fuel cell generates direct electric current from hydrogen and oxygen while forming water.

Figure 1B:
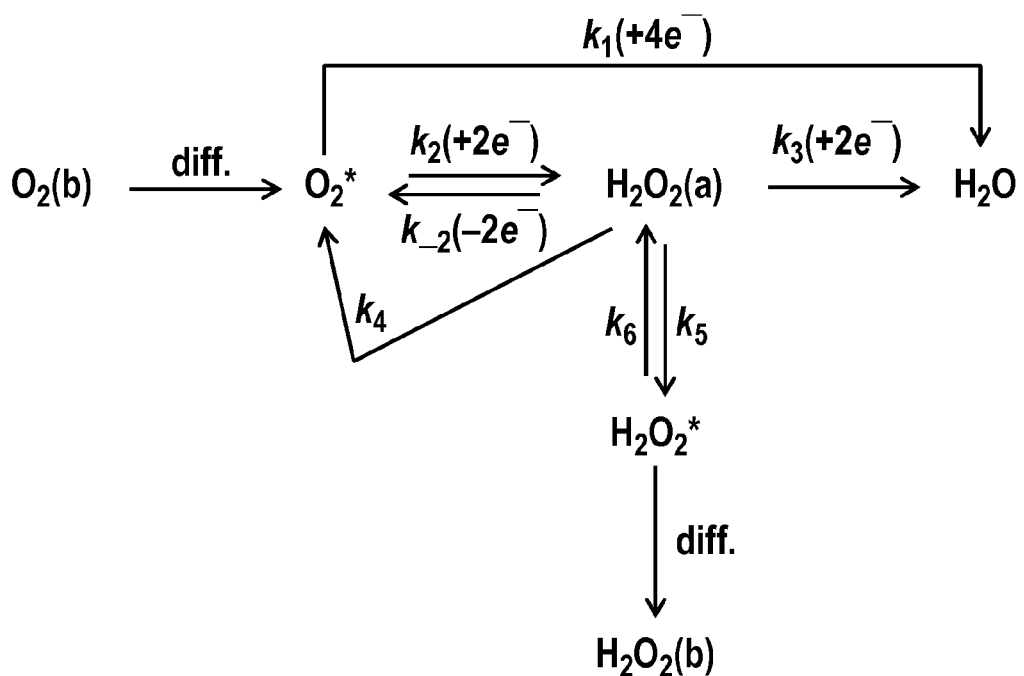
FIG. 1B depicts a pathway of an electroreduction of oxygen pathway for an exemplary fuel cell.

The electroreduction of oxygen pathway, as determined by a rotating ring-disc, is shown in FIG. 1B. The rate constant $k_i$ pertains to the i-th reaction according to the following index notation: (1) four-electron direct reduction to water (or $OH^-$), (2) two-electron reduction to $H_2O_2$ (or $HO_2^-$); (−2) oxidation of $H_2O_2$ (or $HO_2^-$) to $O_2$; (3) electrochemical reduction of $H_2O_2$ to water (or $OH^-$); (4) catalytic decomposition of $H_2O_2$ (or $HO_2^-$) yielding reducible product ($O_2$); (5) desorption of adsorbed $H_2O_2$ (or $HO_2^-$); (6) adsorption of $H_2O_2$ (or $HO_2^-$). Indices b, *, and a, designate the bulk, vicinity of the disc electrode, and adsorbed species, respectively. See, incorporated by reference in its entirety, Wroblowa et al., Electroreduction of Oxygen: A New Mechanistic Criterion, J. Electroanal. Chem., 69 (1976)195-201.

The catalyst layer is in direct contact with the membrane and the gas diffusion layer. It is also referred to as the active layer. In both the anode and cathode, the catalyst layer is the location of the half-cell reaction in a PEM fuel cell. The catalyst layer is either applied to the membrane or to the gas diffusion layer. In either case, the objective is to place the catalyst particles, such as noble elements or noble element alloys, within close proximity of the membrane.

For fuel cells, catalyst activity remains one factor that needs thorough consideration for commercializing fuel cell technologies Inhibition of oxygen reduction reaction ("ORR") results in high over-potentials and hence deterioration in the energy conversion efficiency of a PEM fuel cell. Although efforts have been made to develop fuel cell catalysts having a desirable electro-catalytic ORR, the energy conversion efficiencies are insufficient for high energy demands. Consequently, the development of an improved catalyst would provide a significant high energy demand devices.

It has been found, according to one or more embodiments relating to catalytic specific activity, many of the catalysts investigated for fuel cell use exhibit unacceptably low specific activity for the reasons set forth above. Further, relatively high cost of acceptable catalyst has also been a challenge to commercial acceptability of fuel cell technology. Accordingly, there is a need for an improved catalyst support that increases specific activity and/or reduces costs of the catalyst necessary for catalysis function.

Figure 2:
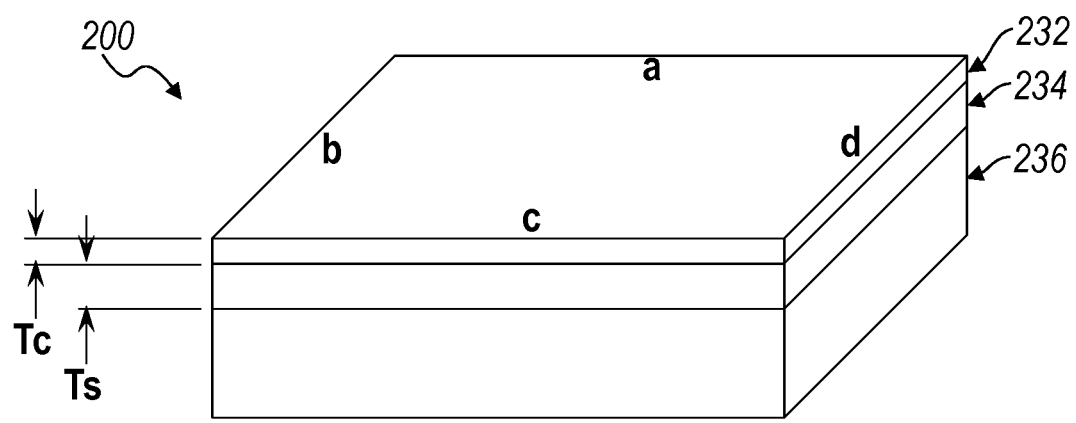
FIG. 2 schematically depicts a sectional view of an electrode in the fuel cell of FIG. 1A.

In one or more embodiments, and as schematically depicted in FIG. 2, a catalyst assembly generally shown at 200 represents a section of the air electrode 132 of FIG. 1A. The catalyst assembly 200 includes a catalyst 232 supported on a substrate 234, wherein the substrate 234 includes an intermetallic compound of Ir and W. The substrate 234 may further be supported on a base 236 such that the substrate 234 is positioned between the catalyst 232 and the base 236.

In one or more embodiments, the term catalyst assembly refers to a device capable of either deriving electrical energy from chemical reactions, or facilitating chemical reactions through the introduction of electrical energy. The electrochemical cell may include a non-rechargeable primary cell, a rechargeable secondary cell, or combinations thereof. For primary cells, when the initial supply of reactants is exhausted, energy cannot be readily restored to the electrochemical cell by electrical means. For secondary cells, chemical reactions may be reversed by supplying electrical energy to the cell, restoring their original composition. One particular example of the electrochemical cell is a fuel cell.

The intermetallic compound structure of the substrate 234 may be identified as follows. A portion of the substrate 234 may be obtained as a Transmission Electron Microscope ("TEM") sample and the TEM sample is then subjected to XRD analysis described herein elsewhere. TEM is a microscopy technique whereby a beam of electrons is transmitted through a thin specimen, interacting with the specimen as it passes through. An image is formed from the interaction of the electrons transmitted through the specimen; the image can then be magnified and focused onto an imaging device, such as a fluorescent screen, or to be detected by a camera. As a whole, this approach may be termed as Selected Area Electron Diffraction ("SAED").

The substrate 234 may optionally be formed substantially entirely or entirely of an intermetallic compound of Ir and W. In this connection, a combined total weight of Ir and W relative to the total weight of the substrate 234 may be no less than 90 percent, 95 percent, or 99 percent, or 100 percent. In certain instances, the substrate includes less than 10%, 8%, 6%, 4%, 2% or 0.1% by weight, or 0% by weight of any noble metals, including platinum, rhodium, palladium, rhenium, gold, rubidium, or the combinations thereof.

In one embodiment, the substrate layer of an intermetallic compound of Ir and W in a combination with a catalyst has specific activity of 3300 $\mu A/cm^2$, which is substantially higher than the specific activity of a catalyst layer supported on a substrate of Ir or W alone which is approximately 2400 $\mu A/cm^2$ each. The specific activity range may be from 2400 to 3600 $\mu A/cm^2$. In other refinements, the specific activity range may be from 3000 to 3400 $\mu A/cm^2$. In another refinement, the specific activity range may be from 3100 to 3300 $\mu A/cm^2$.

When the substrate 234 is substantially entirely formed of an intermetallic compound of Ir and W, Ir and W may be co-sputtered from an Ir source and a W source. Non-limiting examples of the suitable sputtering methods include hexagonal barrel sputtering. By certain temperature and vacuum conditions with the sputtering, Ir and W are co-sputtered and form the intermetallic structure at a surface such as a surface of the base 236. As the composition of Ir and W determines the phase of material present, changing the sputtering rate, and hence the deposition rate and concentration of atoms, and the Ir to W ratio at the surface changes the composition of the deposited film. A resultant layer of Ir and W may be detected non-destructively via the use of XRD.

In this connection, separate deposition of a first layer of W or Ir alone followed by a second layer of Ir or W would not necessarily form an intermetallic compound of Ir and W. However, when the operating temperature is high enough for the deposited W and Ir atoms to travel between the deposited layers, intermetallic compound of W and Ir may form where this cross-layer travel may occur. The desired temperature range for growing the intermetallic compound can be from room temperature to 1200° C. For co-sputtering the components, the desired temperature range can be room temperature to 1200° C., or in other embodiments from room temperature to 700° C. For the case of layer-by-layer sputtering, a temperature greater than 700° C. is desirable, more specifically, a temperature in the range of 700 to 1200° C. Without wanting to be limited to any particular theory, it is believed that the 1200° C. temperature cutoff is primarily due to conventional sputtering system components, and the limitation of outgassing of system components that may lead to contamination.

The catalyst 232 may then be formed by sputtering a catalyst material. This step of sputtering may be performed sequentially after the co-sputtering of Ir and W. The catalyst material may include one or more of the following or their alloys: ruthenium, rhodium, palladium, silver, osmium, iridium, platinum, titanium, niobium, tantalum, gold, or the combinations thereof.

Sputtering is a process whereby atoms are ejected from a solid target material through bombardment with energies. Sputtering may be performed sequentially such that separate layers of materials may be sputtered as time proceeds. Sputtering deposition can be utilized as a means to reduce catalyst assembly costs by achieving ultra-low levels of catalyst loading. For example, a 5 nm sputtered noble element film, such as platinum, corresponds to a catalyst loading level of 0.014 $mg/cm^2$. In comparison, conventional cells have a noble element loading level, such as platinum, around 0.4 $mg/cm^2$. Alternative methods of forming the Ir/W thin film could include plasma spray pyrolysis, or potentially by electrodeposition from molten salts.

However, the substrate 234 may further include additional materials as necessary. For instance, the substrate 234 may further include one or more of the following elements: nickel, carbon, osmium, ruthenium, aluminum, copper, gold, silver, palladium, and the combinations thereof. For instance, the catalyst assembly may be configured as a number of catalyst particles, wherein each catalyst particle includes a core of a support, a substrate contacting the core and including an intermetallic compound of W and Ir, and a catalyst contacting the substrate, such as the substrate is disposed between the core and the catalyst. When the particle size is appropriate, the catalyst particles may be used as an ink to form a membrane electrode assembly (MEA).

Referring back to FIG. 2, the substrate 234 may have a thickness "Ts" and a perimeter "P" which is the sum of all sides "a"+"b"+"c"+"d", wherein a ratio of Ts to P is less than 0.01, 0.005, or 0.001. In this configuration, the substrate 234 can be considered substantially flattened or substantially a thin layer. The substrate 234 may have a thickness of 10 to 50 nm.

Referring back to FIG. 2, the catalyst 232 may have a thickness "Tc" and a perimeter "P" which is the sum of all sides "a" to "d", wherein a ratio of Tc to P is less than 0.01, 0.005, or 0.001. In this configuration, the catalyst 232 can be considered substantially flattened or substantially a thin layer.

The thickness Tc of the catalyst 232 may be smaller than the thickness Ts of the substrate 234. A ratio of Ts to Tc can be 2:1 to 10:1, 2.5:1 to 9.5:1, 3:1 to 9:1, or 3.5:1 to 8.5:1.

In another embodiment the thickness of the catalyst 232 layer and the substrate 234 layer can be described as monolayers or thickness in Angstroms. It is believed that there is a synergy in thickness ratio of the catalyst 232 layer to the substrate 234 that contributes to an increased specific activity. In one non-limiting example, the catalyst 232 layer should be less than or equal to 50 angstroms. In one refinement, catalyst 232 layer includes 4 mono layers (approximately 10 to 12 Angstroms thick of Pt). In another non-limiting example, a catalyst 232 layer of between 5 Angstroms to 50 Angstroms thick is utilized. In another non-limiting example, the substrate 234 layer comprising an intermetallic Ir/W thin film of about 250 Angstroms is used. Without wanting to be limited to any particular theory, it is believed that the intermetallic configuration provides an effective electrocatalytic effect for the oxygen reduction reaction when the d-band has a certain number of electrons inside the orbit, and this optimized d-band electrons can be supplied by the substrate at the interface through the mixing of the electrons at the d-orbits of Pt and substrate. When the Pt is too thick, the electrons from the substrate cannot reach the electrons of Pt at the Pt surface, where the electrocalytic effects can only be provided by Pt itself.

According to one or more embodiments, the relatively high specific activity exhibited by the above-mentioned crystal structure/Pt catalyst activity enables the reduction of Pt metal loading for the PEM cell. A film of the specified composition can be implemented as a thin film catalyst ("TFIC") material to increase the activity of the catalyst beyond that of pure platinum TFIC concepts.

The base 236 or GDL may include or be formed of an electrically inert material. One non-limiting example of a support layer is to provide a foundation for the substrate layer or provide a support for the catalyst layer. Typical examples in the fuel cell uses include, but not limited to, glassy carbon, graphitized carbon, silicon dioxide, carbon fiber, ceramic, plastic, high impact plastic, glass, tempered glass, lava, glazed lava, or the like. However, those skilled in the art would appreciate that the support material may include a myriad of materials that is electrically inert or does not interfere with the electrical chemical capacity of the catalyst layer.

Figure 8:
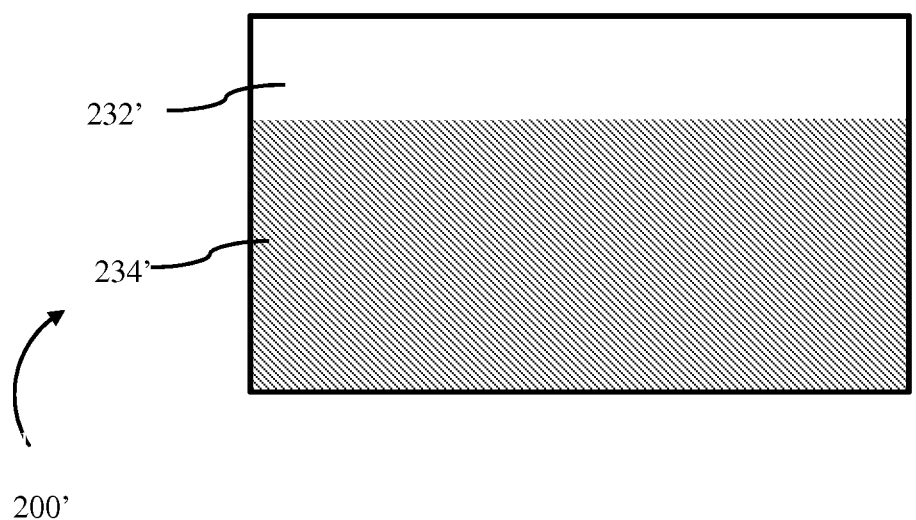
FIG. 8 shows an alternative embodiment of the present invention.

In one or more embodiments, as described in FIG. 8 and herein, the catalyst assembly 200' includes a catalyst 232' layer supported on a substrate 234'. In this alternative embodiment, the catalyst assembly 200' lacks a canonical support or base 236 layer, while the substrate 234' layer independently serves as the support for the catalyst 232' layer.

EXAMPLES

Example 1

An Ir and W target power is adjusted to deposit a constant atomic flux at the glassy carbon substrate surface. Ir and W are co-sputtered onto a 5 mm diameter glassy carbon disk (Tokai Carbon) to a total thickness of 250 Angstroms at a rate of 0.29 Angstroms/sec. A further 50 Angstroms of platinum is sputtered onto the iridium tungsten layer at a rate of 0.07 Angstroms/sec. Glassy carbon is used as geometrically flat, conductive, non-reactive substrate, and is rotated and heated to 300° C. for both depositions. The final deposited film is abbreviated Pt/IrW/GC. The glassy carbon substrate is held in the chamber by a side-mounted copper spring-loaded clip mounted to a molybdenum plate by a type 304 stainless steel screw. The clip does not shadow or limit the deposition area of the glassy carbon substrate.

The sample is cooled to room temperature under vacuum conditions ($4 \times 10^{-8}$ Torr) prior to removal from the sputtering chamber. Kinetic activity of the thin film is evaluated by means of a rotating disk electrode ("RDE") setup with a modified internally developed procedure. The RDE analysis may be used, as a non-limiting example, to determine kinetic parameters of the oxygen reduction reaction, as the limiting current may be determined from the system geometry, and the reactions occur under mass transport control. RDE technique is an ex-situ measurement of catalyst activity. A Bio Logic SP-150 potentiostat is used to evaluate the electrochemical properties of the sample.

Mass activity and specific activity were measured for the sample formed in this example.

Mass activity refers to, in one or more embodiments, the following equation:

$$A_m = i_{0.9}/W$$

where $A_m$ is the mass activity of the catalyst, $i_{0.9}$ is the current density in mA/cm$^2$ at 0.9 V, and W is the loading of noble element in mg/cm$^2$. The mass activity is quoted for operation under 100% $O_2$ and 100% $H_2$ as the reactants. The mass activity reflects the gain/cost factor of a catalyst and is therefore of major importance in the development of economical catalysts for application.

Specific activity refers to, in one or more embodiments, the following equation:

$$A_s = i_{0.9}/S_r$$

where $A_s$ is the specific activity of the catalyst and $S_r$ is the real (accessible) electrochemical surface area of the catalyst in the electrode in cm$^2$.

Figure 3A:
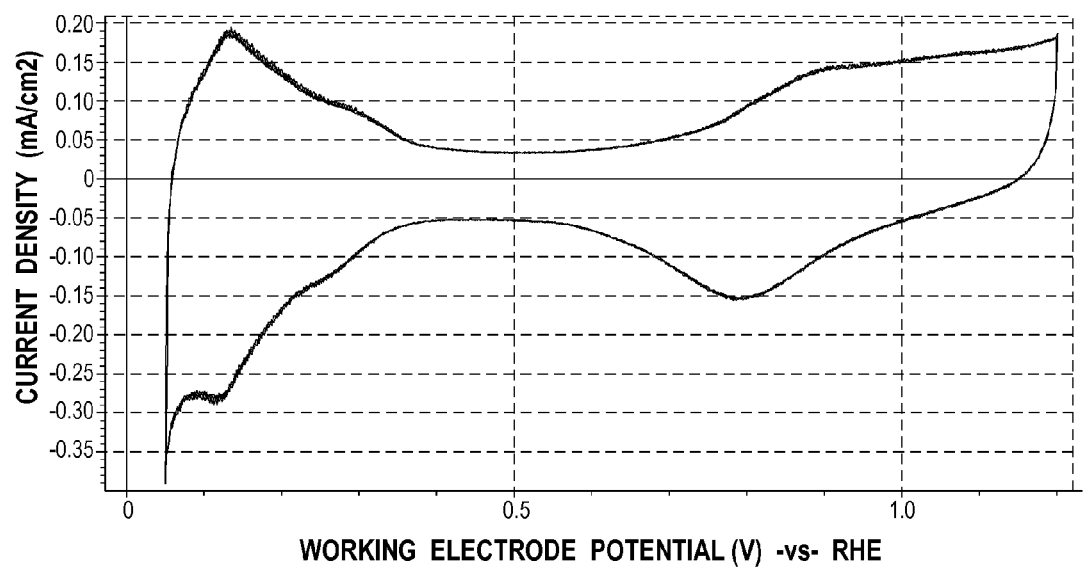
FIG. 3A shows cyclic voltammograms of a sample catalyst assembly as described in the Example.
Figure 3B:
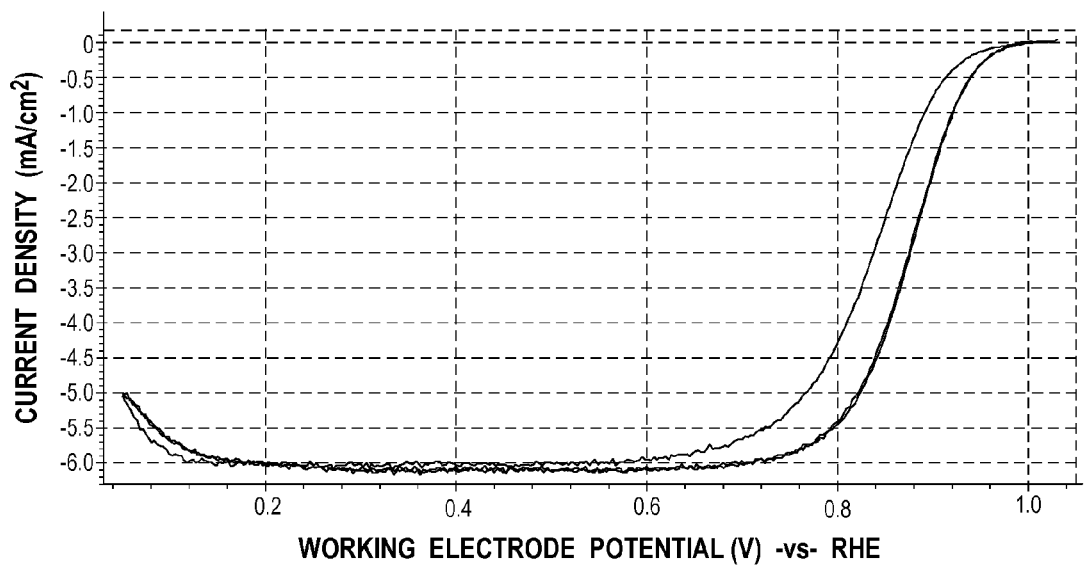
FIG. 3B shows ORR results of the sample catalyst assembly referenced in FIG. 3A.

The cyclic voltammogram of FIG. 3A indicates the characteristic activities of Pt catalyst. The specific activity of the as-made sample is 3300 microamps/cm$^2$ post 30 minutes of oxygen purging of the electrolyte as shown in FIG. 3B. This is higher than the measured specific activity of a pure polycrystalline platinum disk at about 2400 microamps/cm$^2$, indicating that the platinum deposited on the Ir/W substrate has a higher activity towards the oxygen reduction reaction than polycrystalline platinum. The disc is also analyzed for weight percentages for W, Ir and Pt at three separate locations of the disc: the center, half way from the center, and the edge. Table 1 lists EDS data from a JEOL 6300F SEM post RDE experiments. The SEM beam current is set at a level to maintain a 10% dead time in the EDS detector. No oxygen is detected at any location, possibly indicating that any tungsten at the surface is not in an oxidized state. As shown in Table 1, it appears distribution of the W, Ir and Pt is quite uniform. This confirms that the sputter deposited material has a roughly uniform distribution across the disk surface.

TABLE 1

| | Component | Weight % | Atom % | Atom Fraction W/Ir |
|---|---|---|---|---|
| Center | W | 34 | 35 | 42 |
| | Ir | 48 | 48 | 58 |
| | Pt | 18 | 18 | n/a |
| Halfway | W | 33 | 34 | 41 |
| | Ir | 51 | 50 | 59 |
| | Pt | 16 | 16 | n/a |
| Edge | W | 34 | 34 | 41 |
| | Ir | 49 | 48 | 59 |
| | Pt | 18 | 18 | n/a |

Example 2

In this example, ORR activities of three catalyst compositions are measured against a benchmark control, which is a flat polycrystalline platinum disc with an established activity value of 2400 $\mu A/cm^2$. Against this control is a catalyst sample one formed by sputtering 5 nm Pt on a previously sputtered W layer of 25 nm, which is in turn further supported on 1.0 μm silicon (IV) oxide. Against this control is also a catalyst sample two formed by sputtering 5 nm Pt on a previously sputtered Ir layer of 15 nm. Further against this control is a catalyst sample three formed by sputtering 5 nm Pt on a previously co-sputtered W/Ir layer of 25 nm with a weight ratio of W to Ir being at 1:1. The vacuum chamber is controlled to maintain a pressure of 5 mTorr UHP argon (Airgas) during the deposition process. Magnetron sputtering power is 50 W to the iridium target (Plasmaterials), 62 W to the tungsten target (Kurt J. Lesker), and 16 W to the platinum target (Plasmaterials), and does not vary by more than ±1 W during the several minutes each target is active.

These compositions are evaluated ex-situ by means of the RDE technique, and the commonly accepted measure of catalytic activity is specific activity measured at 0.9V in terms of $\mu A$ of current per $cm^2$ ($\mu A/cm^2$). The active surface area is determined from an electrochemical surface area (alternatively named as ECA, ECSA, or ESA) and the corrected current measured at 0.9V during the ORR experiment. A non-limiting example of the experimental procedure can be found in: K. J. J. Mayrhofer et al., entitled "Measurement of oxygen reduction activities via the rotating disc electrode method: From Pt model surfaces to carbon-supported high surface area catalysts," Electrochim. Acta 53 (2008) 3181-3188, which is hereby incorporated by reference in its entirety. Accordingly, the activity of a potential catalyst can be ranked against other materials.

Figure 4:
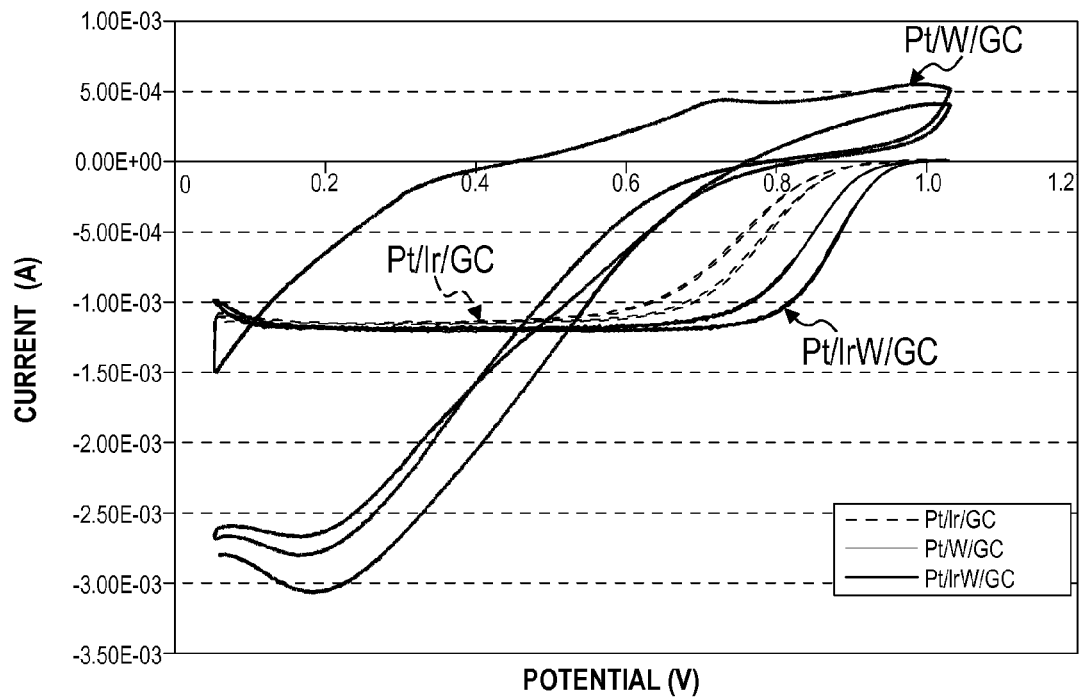
FIG. 4 shows cyclic voltammograms of another sample catalyst assembly as described in an Example in view of comparative controls.

The resulting positive currents of catalyst sample one to three are measured at 0.9V and depicted in FIG. 4. The analysis result of catalyst sample one indicates that an oxidation reaction is somewhat occurring, but not with satisfactory performance within the context of oxygen reduction reaction. The analysis result of catalyst sample two indicates that an oxidation reaction is occurring with an activity measured at 160 $\mu A/cm^2$. This value is comparatively low. The analysis result of catalyst three indicates that an oxygen reduction reaction occurs with an activity measured at 3300 $\mu A/cm^2$.

This example shows that Pt can perform with a catalytic activity comparable to its bulk activity when supported on W and Ir at certain weight ratios. As the value for specific activity obtained for Pt/IrW is higher than those of pure Pt, Pt/Ir, and Pt/W, Pt/IrW has a higher activity towards the oxygen reduction reaction than these other materials. The reported result is significant since the Pt/IrW system has higher specific activity than a pure, flat polycrystalline surface, indicating that the platinum deposited on the iridium tungsten substrate has a higher activity towards the oxygen reduction reaction than polycrystalline platinum.

Example 3

In this example, anti-corrosion capabilities are compared between W alone and W coated with 5 nm Pt. The 5 nm Pt on W result also displays significant variation during the experiment, indicating instability in the catalytic activity of the layer as a result of competing electrochemical processes, such as corrosion.

Figure 5A:
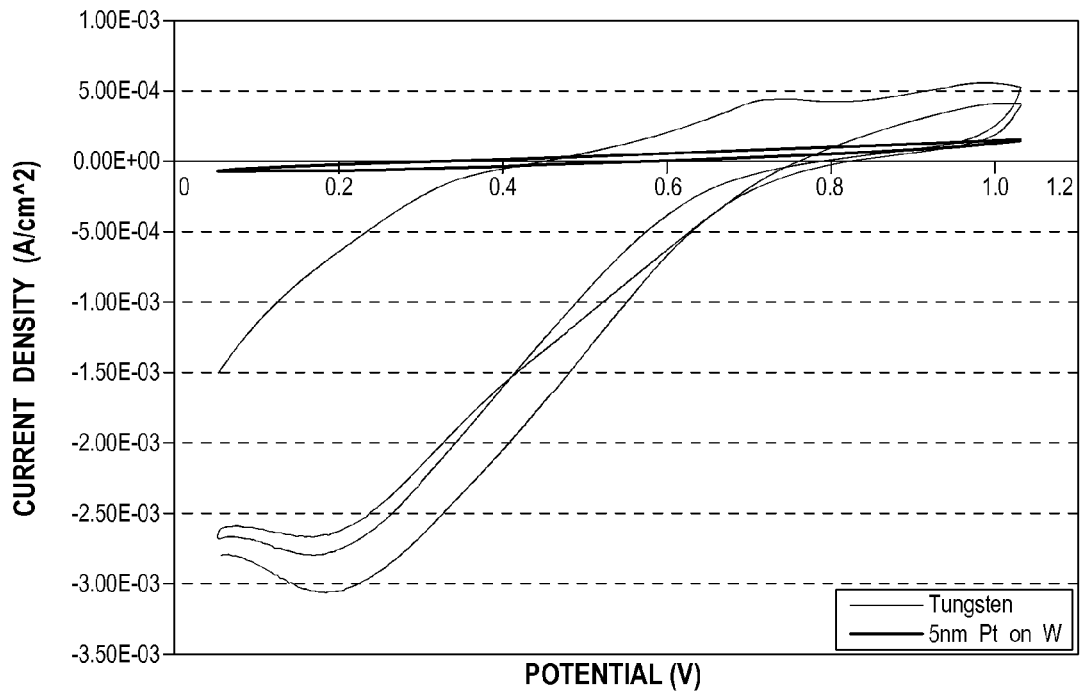
FIG. 5A shows cyclic voltammograms of certain controls as described in an Example.
Figure 5B:
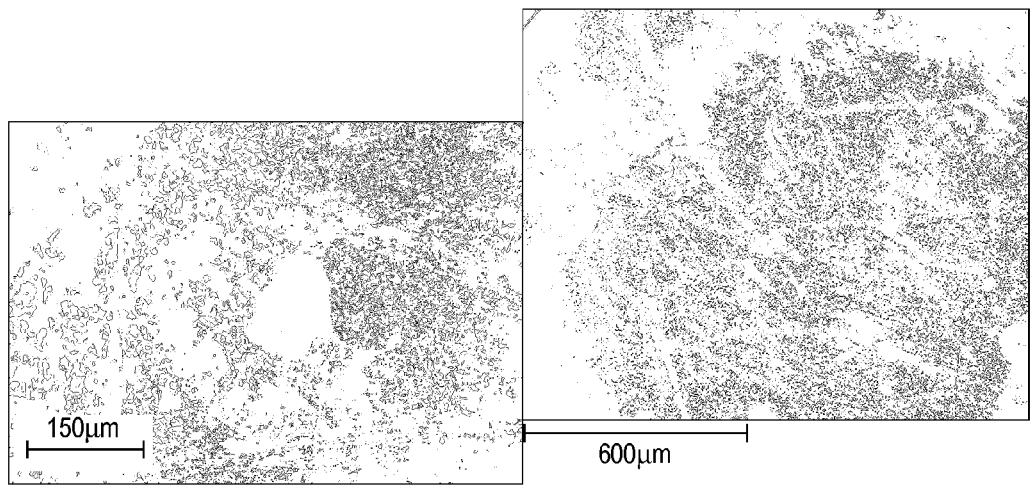
FIG. 5B shows light optical and SEM images of one of the controls referenced in FIG. 5A.

FIG. 5B shows light optical (left) and SEM (right) images of the surface of a 5 nm Pt/W sample after ORR evaluation. The dark area of the light optical image indicates a region of nanostructure growth over the initially polished surface. The nanostructure features are smaller than the wavelength of the incident light, which results in total visible light absorption at this region. The nanostructures are dendritic growths of tungsten oxide as a result of corrosion of the underlying tungsten layer.

Example 4

Figure 6A:
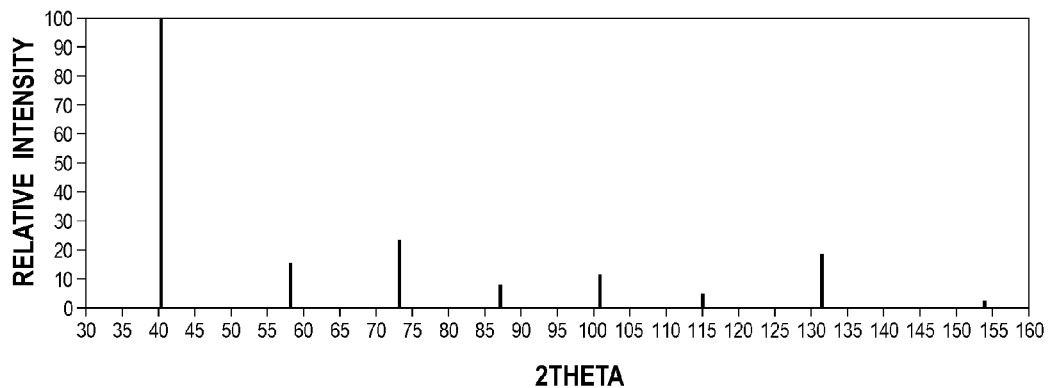
FIG. 6A shows an XRD profile of W alone.

FIG. 6A shows a sample XRD profile of W alone in a cubic crystal form at 299 degrees Kelvin. This profile shows a strong signal at 2Theta value of around 40 and several other weaker signals at 2Theta values of around 57, 72, 87, 100, 115 and 130.

Figure 6B:
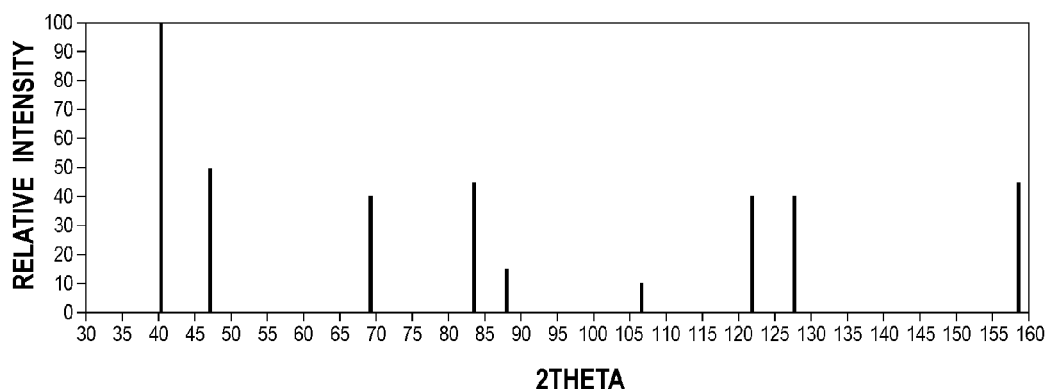
FIG. 6B shows an XRD profile of Ir alone.

FIG. 6B shows a sample XRD profile of Ir alone in a cubic crystal form at 299 degrees Kelvin. This profile shows a strong signal at 2Theta value of around 40 and several other weaker signals with 2Theta values of around 47, 69, 83, 87, 107, 122, 127 and 160.

Figure 6C:
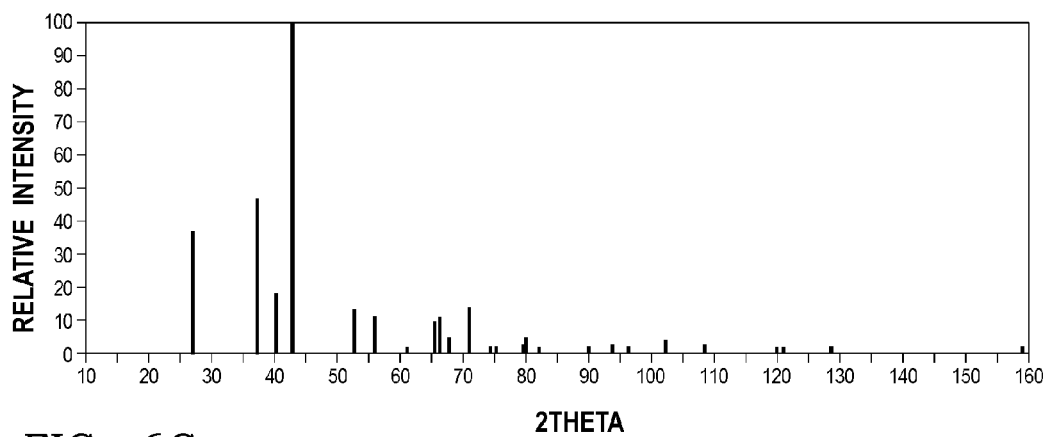
FIG. 6C shows an XRD profile of an intermetallic compound of W and Ir.

FIG. 6C shows a sample XRD profile of an intermetallic compound of W and Ir in orthorhombic crystal, performed at 299 degrees Kelvin. This profile shows that the signal at 2Theta of 40 is no longer the strongest and a new signal with 2Theta value of around 42 is the strongest signal among all observed and that signal is not present in FIGS. 6A and 6B.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A catalyst assembly comprising:
   a substrate including a layer of an intermetallic W/Ir compound having a W/Ir weight ratio in a range of 48:52 and 51:49 with an XRD profile including a first 2Theta peak located between 33 and 41 and a second 2Theta peak located between 23 and 31; and
   a noble metal catalyst supported on and contacting the layer of the intermetallic W/Ir compound.

2. The catalyst assembly of claim 1, wherein the specific activity of a combination of the substrate and the catalyst is in the range of 2400 to 3600 $\mu A/cm^2$.

3. The catalyst assembly of claim 1, wherein the W/Ir intermetallic compound includes an ordered atomic configuration of W and Ir atoms.

4. The catalyst assembly of claim 1, wherein the W/Ir intermetallic compound consists essentially of W and Ir.

5. The catalyst assembly of claim 1, wherein a combined weight percent of Ir and W relative to the total weight of the substrate is no less than 90 percent.

6. The catalyst assembly of claim 1, wherein the substrate includes a substrate surface and a substrate thickness, the ratio of the substrate thickness to the perimeter of the substrate surface being less than 0.01:1.

7. The catalyst assembly of claim 6, wherein the substrate thickness is 10 to 50 nm.

8. The catalyst assembly of claim 6, wherein the catalyst includes a catalyst surface and a catalyst thickness, the ratio of the catalyst thickness to the perimeter of the catalyst surface being less than 0.01:1.

9. The catalyst assembly of claim 8, wherein the ratio of the substrate thickness to the catalyst thickness is 2:1 to 10:1.

10. The catalyst assembly of claim 1, further comprising a base, the substrate being positioned between the base and the catalyst.

11. The catalyst assembly of claim 10, wherein the base includes a gas diffusion layer ("GDL") selected from the group consisting of glassy carbon, graphitized carbon, silicon dioxide, carbon fiber, ceramic, plastic, high impact plastic, glass, tempered glass, lava, glazed lava, and combinations thereof.

12. A catalyst assembly comprising:
   an intermetallic W/Ir compound layer having a W/Ir weight ratio in a range of 48:52 and 51:49 and an XRD profile including a first 2Theta peak located between 33 and 41 and a different second 2Theta peak located between 39 and 47, respectively, the first peak having an intensity of 42 to 50% of the second peak; and
   a noble metal catalyst supported on and contacting the intermetallic W/Ir compound layer.

13. The catalyst assembly of claim 12, wherein the W/Ir intermetallic compound includes an ordered atomic configuration of W and Ir atoms.

14. The catalyst assembly of claim 12, wherein the W/Ir intermetallic compound consists essentially of W and Ir.

15. A catalyst assembly comprising:
   an intermetallic W/Ir compound layer having a W/Ir weight ratio in a range of 48:52 and 51:49 and an XRD profile including a first 2Theta peak located between 23 and 31 and a second 2Theta peak located between 39 and 47, respectively, the first peak having an intensity of 31 to 39% relative to the second peak; and
   a catalyst supported on and contacting the intermetallic W/Ir compound layer.

16. The catalyst assembly of claim 15, wherein the W/Ir intermetallic compound includes an ordered atomic configuration of W and Ir atoms.

17. The catalyst assembly of claim 15, wherein the W/Ir intermetallic compound consists essentially of W and Ir.

18. The catalyst assembly of claim 15, wherein the catalyst is a noble metal catalyst.

* * * * *